3,472,181
MECHANISM FOR PLACEMENT OF FIRST COOKIE ON ICE CREAM SANDWICH
Harold L. Komberec, 1511 N. Wall St. 99201, Dillon K. Kilcup, 1012 N. Cleveland Ave. 99205, and Alfred T. Smith, Otis Orchards, all of Spokane, Wash.
Filed Oct. 16, 1967, Ser. No. 675,706
Int. Cl. A23g 3/00; B65g 47/04, 47/16
U.S. Cl. 107—1                                5 Claims

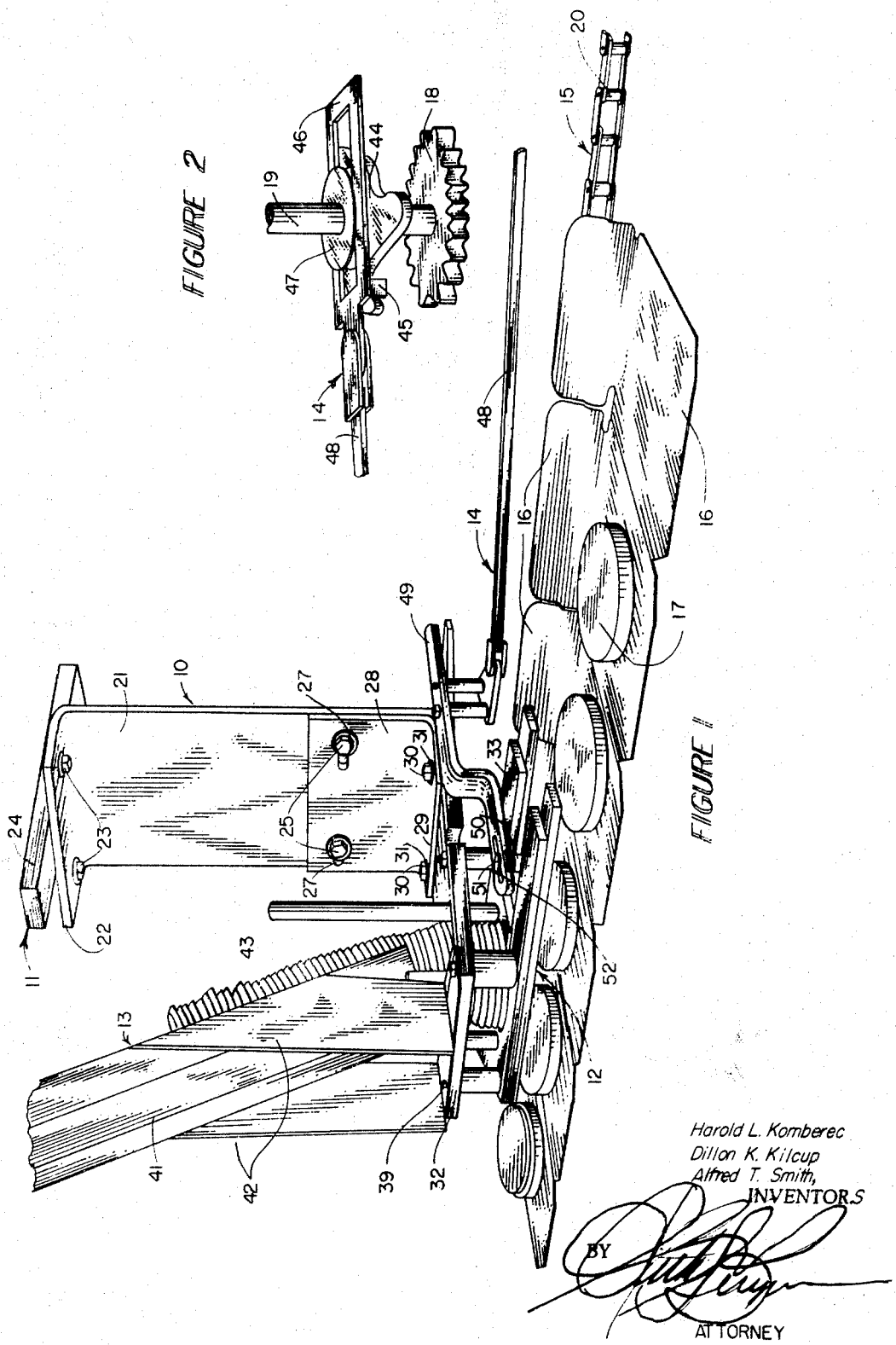

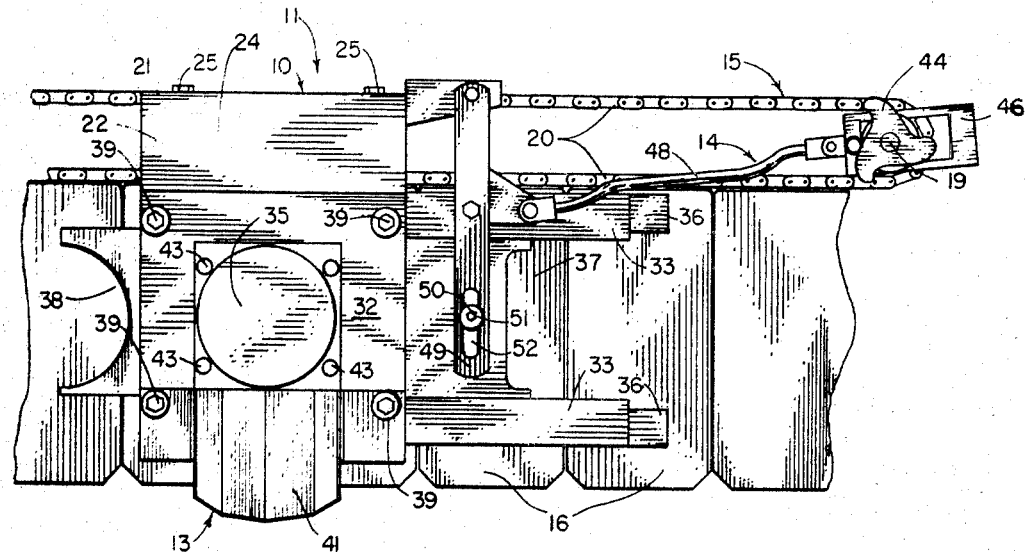
FIGURE 3
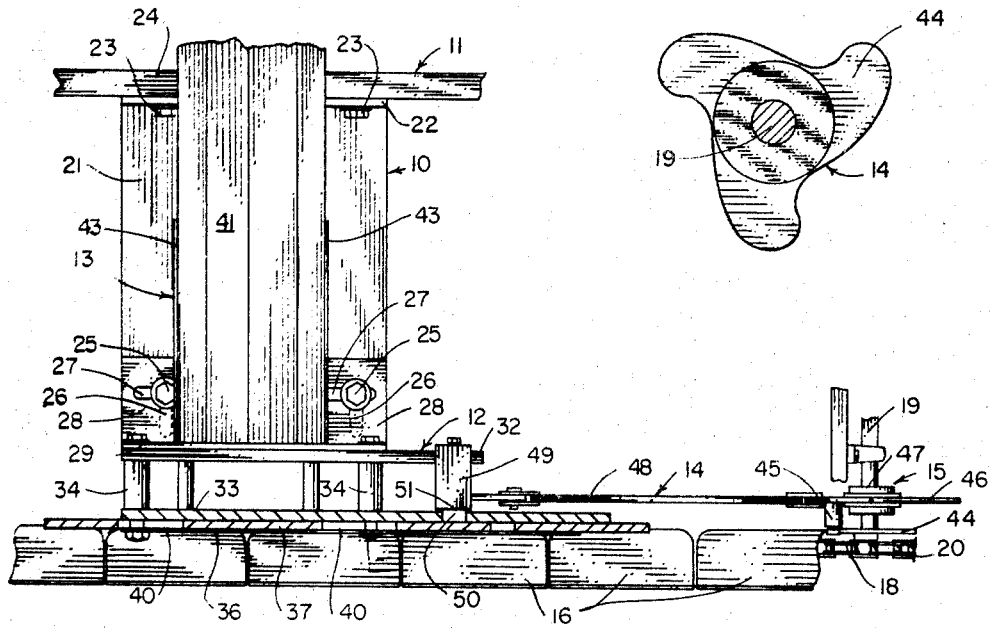
FIGURE 4
FIGURE 5
Harold L. Komberec
Dillon K. Kilcup
Alfred T. Smith,
INVENTOR.
BY
ATTORNEY Oct. 14, 1969  H. L. KOMBEREC ET AL  3,472,181
MECHANISM FOR PLACEMENT OF FIRST COOKIE ON ICE CREAM SANDWICH
Filed Oct. 16, 1967  3 Sheets-Sheet 3
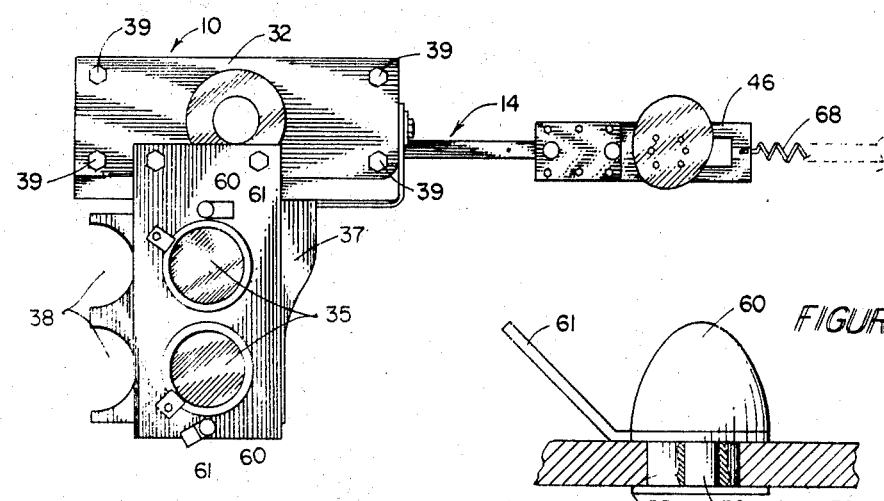
FIGURE 6
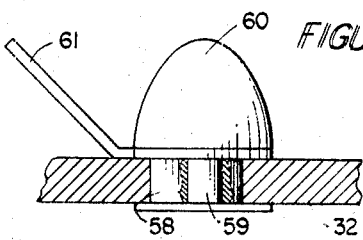
FIGURE 9
FIGURE 7
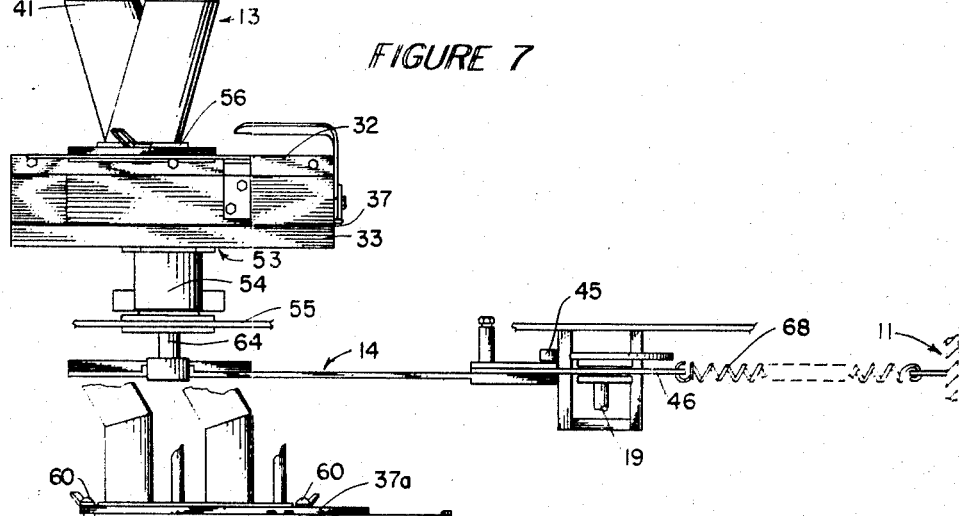
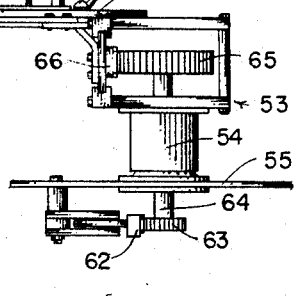
FIGURE 8
Harold L. Komberec
Dillon K. Kilcup
Alfred T. Smith,
INVENTORS.
BY
ATTORNEY

United States Patent Office 3,472,181
Patented Oct. 14, 1969

ABSTRACT OF THE DISCLOSURE

An auxiliary mechanism, for use for existing conveyor carrying sharp freeze boxes, adapted to place a flat cookie upon the upper surface of a prepositioned ice cream slab carried by pallets of such conveyor. The mechanism is timed by the conveyor driving linkage and has a cookie feed mechanism adapted to lessen fouling caused by broken cookies. The entire structure is of a nature to meet sanitation standards of the food industry.

BACKGROUND OF INVENTION

Related applications

There are no applications directly related hereto filed in this or any foreign country, though the inventors have heretofore applied for Letters Patent upon the process by which the mechanism herein claimed operates.

Field of invention

This invention relates generally to the formation of ice cream sandwiches and more particularly to a mechanism to place a first cookie on the top of a preformed and prepositioned slab of ice cream carried by plural pallets joined to form a conveyor structure to transit the product relative associated sharp freezing equipment.

Description of prior art

Ice cream sandwiches embodying a configurated slab of ice cream associated with a cookie type structure on one or both sides thereof have become a major item of commerce in the ice cream novelty field. Many devices have heretofore become known to form such novelties, either by hand or by automatic machine, but none of these devices have operated in conjunction with the palletized conveyor type of sharp freezing equipment commonly used in the formation of other ice cream novelties.

The devices heretofore known may be divided into a first class forming a sandwich with a hardened slab of ice cream and into a second class performing the function with a soft slab. It is with an improvement of devices of the second class that the instant invention is concerned.

Generally such formation has heretofore been accomplished either by using one or both cookies to directly support the soft ice cream or else an auxiliary structure to cooperate with one or both cookies to support the slab. The formation of such sandwiches has not been accomplished on palletized conveyor of freezing equipment because with the ice cream at least partially supported by a cookie, there was either no certain support of the cookie by a pallet (because of lack of friction or adherence therebetween) or some complex and costly additional structure, associated with each pallet, was required to support the sandwich during freezing.

The instant invention is distinguished from this art in that mechanism is provided to place a cookie in a nonsupporting position on top of a preformed, prepositioned slab of soft ice cream, thusly allowing the ice cream slab to remain adhered to a pallet to thereafter be sharp frozen by the traditional process. The device is timed by mechanical linkage with the conveyor mechanism and a cookie handling element is provided that is especially free of fouling problems carried by broken or improperly configured cookies.

SUMMARY OF INVENTION

The instant invention provides an auxiliary structure that may be attached to existing sharp freeze equipment common in the ice cream novelty industry. This equipment provides a freezing box with an associated conveyor carrying a plurality of individual pallets for transit of product within the box for the freezing operation and externally thereof for placement and removal of product. Commonly such a mechanism has associated with it an extrusion device adapted to preform an ice cream slab in a particular configuration and place it in predetermined position upon the conveyor pallets for sharp freezing.

The instant invention provides an auxiliary mechanism for use with such freezing devices. A cookie placing mechanism, positioned above the conveyor structure, deposits a cookie on an ice cream slab therebelow; a feeding mechanism feeds cookies from a contained supply to the placing mechanism by gravity and mechanical linkage communicates with the conveyor structure drive to time the cookie placing mechanism to place a cookie in proper position.

The cookie placing mechanism is a slide activated device adapted to positively move cookies, even of a broken and fractured nature, and avoid any further particulation thereof. The entire mechanism of such construction as to be in compliance with various sanitary rules and regulations.

A principal object of our invention is to provide an auxiliary structre for use on existing palletized conveyor type sharp freeze equipment that will place a cookie on the top of a preformed and prepositioned slab of ice cream carried on such conveyor;

A further object to provide such a device that will meet the varying health standards and sanitary regulations of the several states and many foreign countries;

A further object to provide such a device that will effectively handle broken and fractured cookies common in the business;

A still further object to provide such a device that is of new and novel design, of sturdy and durable nature, of simple and economic manufacture, and one that is otherwise well adapted for the uses and purposes for which it is intended.

Other and further objects of our invention will appear from the following specification and accompanying drawings which form a part of this application. In carrying out the objects of our invention, however, it is to be understood that its essential features are acceptable of change in design and structural arrangement with only one preferred practical embodiment being illustrated in the accompanying drawings, as required.

BRIEF DESCRIPTION OF DRAWINGS

In the accompanying drawings, wherein like numbers of reference refer to similar parts throughout:

FIGURE 1 is a partial isometric view of the cookie storing and dispersing mechanism of our invention in operative position over the normal palletized conveyor of existing sharp freezing equipment.

FIGURE 2 is a partial isometric view of the cam timing mechanism of our invention in place on the driving shaft of the conveyor drive.

FIGURE 3 is an orthographic top or plan view of the mechanism of FIGURE 1, showing its various parts, their configuration, and relationship from this aspect.

FIGURE 4 is an orthographic rear view of the invention of FIGURE 1, again showing the various parts, their relationship and configuration from this aspect.

FIGURE 5 is a orthographic plan view of the cam shown in FIGURE 2, and used to time the mechanism of our invention.

FIGURE 6 is a top orthographic view of a two cookie specie of dispersing mechanism with the cookie stacking supports removed.

FIGURE 7 is a partially cut-away vertical orthographic front view of the invention of FIGURE 6 with the cooking stacking supports in place.

FIGURE 8 is a partially cut-away vertical orthographic end view of the invention of FIGURE 6 again with the cookie stacking supports in place.

FIGURE 9 is a partially cut-away orthographic view of an eccentric type adjustable fastener.

DESCRIPTION OF THE PREFERRED EMBODIMENT

Referring now to the drawings in more detail and particularly to that of FIGURE 1, it will there be seen that our invention comprises generally mounting structure 10 communicating with the existing structure of the freezing unit 11 to mount cookie dispersing member 12 over the conveyor structure of the freezing unit; the cookie dispersing member is supplied from storage element 13 and is provided with timed motion by mechanical driving linkage 14 communicating with the driving linkage of the conveyor of the freezing unit.

Existing sharp freeze novelty equipment of commerce includes a freezing box (not shown) with an associated conveyor structure 15 carrying plural pallets 16 externally of the freezing box for placement and removal of product and internally thereof for sharp freezing. An associated ice cream unit (not shown) generally an extrusion head, places soft ice cream slabs 17 of predetermined shape in predetermined position upon each of the pallets 16. The conveyor is powered by a prime mover (not shown) activating drive cog 18 carried on shaft 19, as illustrated in FIGURE 2. This mechanism in turn drives conveyor chain 20. These various structures are well known in the ice cream novelty art and common on such quick freezing units are those commonly known as the Nelson Box, Turner Box, or Polarmatic freezing unit and constitutes no part of the instant invention.

Mounting structure 10 includes upper L shaped element 21 having horizontal flange 22 releasably communicating by bolt-nut combinations 23 with frame element 24 of the existing freezing unit. This upper element adjustably communicates by bolt-nut combinations 25 extending through vertically elongate slots 26 in member 21 and horizontally elongate slots 27 in lower element 28 to provide for adjustment in two dimensions of members carried by lowermost horizontal flange 29 of lower element 28. This lowermost flange 29 communicates by nut-bolt combinations 30 extending through outwardly elongate slots 31 to upper plate 32 of cookie dispersing member 12 to provide adjustment of this structure in the third dimension relative frame element 24.

Cookie dispersing member 12 includes top plate 32 maintained at a spaced distance above lower plate 33 by spacing elements 34. Both upper and lower plates 32, 33 have appropriate medial orifices 35 to allow vertical passage of cookies from storage element 13. Lower plate 33 mounts flange element 36 at a spaced distance immediately therebelow to slidably carry cookie slide 37 therebetween. This cookie slide is an elongate sheet-like member shaped in its forward edge 38 with a configured orifice adapted to conform to substantially one-half of a cookie to be moved thereby.

Flange element 36 is a substantially planar element forming a lower surface beneath orifices 35 in the lower plate so that cookie slide 37 may slide on the upper surface thereof and move a cookie supported by flange element 36 therefrom in a forward direction. Preferably the mounting of flange element 36 is by means of nut-bolt combinations 39 extending through spacing elements 34 and elongate slots 40 in the flange element to allow for lineal positioning of the forward edge 38 of flange element 36 relative to conveyor structure 15 therebelow to determine the point of deposition of a cookie on an ice cream slab.

Storage element 13 includes an angled chute 41 preferably open on one side to allow easy manipulation of cookies therein and configured to support a substantial portion of the periphery of a cookie to maintain it in the chute and allow gravity passage therealong. This chute is maintained in an appropriate angled position by support elements 42 to feed its product by gravity through orifice 35 in top plate 32 upon demand by removal of cookies therebelow. Forward aligning bars 43 extend vertically about the periphery of orifices 35, opposite the chute, to maintain proper vertical passage of cookies through plates 32, 33.

Mechanical driving linkage 14 includes cam 44 irrotatably mounted upon conveyor drive shaft 19 and cam follower 45 carried by follower yoke 46 slidably and rotatably supported by yoke wheel 47 in turn carried by shaft 19. The cam follower pivotably communicates with motion arm 48 which in turn pivotably communicates with offset slide arm 49 pivotably carried by slide post 50 in turn communicating with the cookie slide 37. Preferably the communication between slide arm 49 and slide post 50 is releasable by means of bolt 51 extending through elongate slot 52 to allow for appropriate positioning of the element by reason of different structure of machines upon which it is to be attached. Obviously, however, the various mechanical levers of this structure might be sized to accommodate the apparatus to any particular machine.

A somewhat modified specie of our invention is shown in the illustrations of FIGURE 6 et seq. This particular specie of invention is adapted to place two cookies simultaneously upon two slabs of icecream positionally carried upon one pallet in a side by side relationship.

Here mounting structure 10 comprises the top plate 32 supported by gear box 53 in turn supported by depending post 54 releasably carried by table 55 of the freezing unit 11. The storage element 13 has chutes 41 adapted to be self-supporting and maintained in appropriate position by clamps 56 carried by top plate 32.

The cookie dispersing member includes top plate 32 and lower plate 33 in immediately adpacent spaced relationship with slide 37 moving therebetween adpacent each plate. Slide 37a is essentially the same as that previously described except there are two forward configured areas 38 to receive cookies from each chute simultaneously. The plates are maintained in moveably aligned position by means of an eccentric nut-bolt combination illustrated in FIGURE 9. This includes headed bolt 57 extending through circular sleeve 58 having eccentrically located bolt hole 59 and threadedly engaging cap 60 with manipulating handle 61 associated with sleeve 58. With this structure, as the sleeve be rotated, the alignment of the lower plate relative the upper plate may be appropriately varied for adjustment within limits.

Mechanical driving linkage 14 embodies a single lobed cam and slightly different follower mechanism 45. The mechanism communicates by motion arm rack 62 with lower pinion 63 irrotatably carried by motion shaft 64, in turn carrying upper slide pinion 65 in its uppermost extension within the chamber of gear box 53. Slide rack 66 engages upper pinion 65 and in turn is carried by rack support 67 communicating with cookie slide 37a to provide a sliding motion thereof relative gear box 53 and plates 32, 33. This particular form of invention allows for adjustment of speed of conveyor driving shaft by means of the internal gearing of the mechanism rather than the shape of the follower cam.

The cam follower yoke 46 is biased to a rearward position by spring 68 communicating between the yoke and a portion of the existing freezer unit 11.

From the foregoing description of the mechanism of our invention, the operation of either specie can now be understood.

Conveyor structure 15 is moved in a linear course beneath our invention by means of rotary motion of driving shaft 19. Before passage of the conveyor beneath our invention, a preformed slab of ice cream is positioned upon each pallet at a position determined by conveyor motion. By reason of this, the particular position of each ice cream slab beneath my invention will be uniquely determined by the rotary motion of the driving shaft 19 and by reason of this, with appropriate configuration of cam 44, cookie slide 37 may be made to move forwardly to deposit a cookie from the invention upon the top of each ice cream slab.

In the specie of invention illustrated in FIGURE 2, the relative speed of elements is such that three pallets would be moved beneath cookie slide 37 for each complete revolution of driving cog 18, and it can be seen that the cog is so configured that at the time an ice cream slab is vertically beneath orifices 35, cookie slide 37 will begin its forward motion and the forward motion of cookie and slab will remain essentially constant until such time as a sufficient portion of the cookie is pushed forwardly of the forwardmost edge of lower plate 33 or flange element 36, as the case may be, so that it deposits by gravity upon the surface of slab 17 therebeneath.

The support 10 may be properly adjusted to align the orifice 35 with the lineal course of travel of ice cream slab 17 and the mechanism may be positioned with its lowermost portion immediately above such slabs. The position of deposition of the cookie may be regulated within limits by the positioning of the forward edge of the plate supporting the cookie, either lower plate 33 or flange element 36, as the case may be.

A supply of cookies in angled chute 41 must be manually replaced but so long as a supply is maintained therein, the cookies will feed by gravity to upper orifice 35 and thence be dispersed as aforesaid.

The foregoing description of our invention is necessarily of a detailed nature so that a specific embodiment of it might be set forth as required, but it is to be understood that various modifications of detail, rearrangement and multiplication of parts may be resorted to without departing from its spirit, essence or scope.

Having, thusly described our invention, what we desire to protect by Letters Patent, and

What we claim is:

1. In an auxiliary mechanism for placement of a sheetlike cookie upon a preformed slab of ice cream in a freezing unit of commerce having a palletized conveyor moving lineally outside of a freezing box for placement of product thereon, an extrusion head placing configured slabs of ice cream on the pallets thereof in position determined by conveyor motion, and a rotating shaft driving said conveyor, the invention comprising, in combination:

a mounting structure to adjustably position said mechanism over said conveyor;

a cookie dispersing member communicating with said mounting structure and including an upper plate and lower plate in spaced relationship with a cookie slide slideably carried and adapted to push cookies presented through an orifice in said upper plate forwardly over the forwardmost edge of said lower plate to deposit such cookies by further action of gravity upon ice cream slabs therebeneath;

a cookie storage member communicating with the cookie orifice in said upper plate to present cookies carried therein in vertical stacked fashion therethrough; and mechanical linkage communicating between the cookie side plate and the rotating shaft driving the conveyor to move said slide plate forwardly to deposit the lowermost cookie carried in the cookie dispersal member upon an ice cream slab carried by the conveyor therebeneath.

2. The invention of claim 1 wherein the mechanical linkage communicating with the cookie slide plate comprises, in combination:

a cam irrotatably carried by the rotating shaft driving conveyor;

a cam follower mounted to translate the rotary motion of said cam into linear motion;

a lever communication between said cam follower and the cookie slide plate transferring the lineal motion of the cam follower thereto.

3. The invention of claim 1 wherein the cookie dispersing member is further characterized by plural cookie orifices in laterally spaced side-by-side relationship positioned to deposit cookies on more than one ice cream slab carried in predetermined laterally spaced position upon the conveyor pallets.

4. The invention of claim 1 wherein the mechanical linkage communicating with the cookie slide plate comprises, in combination:

a cam irrotably carried by the rotating shaft driving the conveyor;

a cam follower associated therewith to translate the rotary motion of said cam into lineal components; and a mechanical communication including a rack and pinion to communicate the lineal component of motion of the cam follower to the cookie slide plate to cause the disposition of cookies thereby.

5. The invention of claim 1 wherein the cookie dispersing member is further characterized by:

said lower plate being adjustably positionable in the direction of cookie travel to adjustably regulate the point of cookie dispersal.

References Cited

UNITED STATES PATENTS

| 1,108,454 | 8/1914  | Maisch   | 107—1.6 |
| 1,482,138 | 1/1924  | Moomjiam | 107—1.6 |
| 2,673,531 | 3/1954  | Beer     | 107—1.6 |
| 2,722,900 | 11/1955 | Knee     | 107—1.6 |
| 2,875,708 | 3/1959  | Hensgen  | 107—1.6 |

EDWARD L. ROBERTS, Primary Examiner

U.S. Cl. X.R.

198—59